(12) United States Patent
Jeffrey (10) Patent No.: US 11,148,006 B2
(45) Date of Patent: Oct. 19, 2021

(54) CONDITIONING AND REHABILITATION SYSTEM AND RELATED METHODS USING COMPANION ELECTRONIC DEVICES

(71) Applicant: Richard Jeffrey, Santa Barbara, CA (US)

(72) Inventor: Richard Jeffrey, Santa Barbara, CA (US)

( * ) Notice: Subject to any disclaimer, the term of this patent is extended or adjusted under 35 U.S.C. 154(b) by 272 days.

(21) Appl. No.: 16/240,826

(22) Filed: Jan. 7, 2019

(65) Prior Publication Data

US 2020/0215387 A1  Jul. 9, 2020

(51) Int. Cl.
*A63B 24/00* (2006.01)
*H04W 64/00* (2009.01)
*G06F 9/30* (2018.01)

(52) U.S. Cl.
CPC ...... *A63B 24/0021* (2013.01); *A63B 24/0003* (2013.01); *G06F 9/30003* (2013.01); *H04W 64/003* (2013.01); *H04W 64/006* (2013.01)

(58) Field of Classification Search
CPC . G06F 19/3481; A63B 24/00; A63B 24/0003; A63B 24/0086; A63B 2213/00; A63B 2220/00; A63B 2220/10; A63B 2220/20
See application file for complete search history.

(56) References Cited

U.S. PATENT DOCUMENTS

| | | | | |
|---|---|---|---|---|
| 8,990,006 B1* | 3/2015 | Wallace | ............... | G01C 22/006 701/408 |
| 9,672,754 B2* | 6/2017 | Yuen | ....................... | G06F 11/00 |
| 9,919,198 B2* | 3/2018 | Romeo | .............. | A63B 71/0619 |
| 2006/0025282 A1* | 2/2006 | Redmann | ............... | A61B 5/103 482/8 |
| 2008/0119763 A1* | 5/2008 | Wiener | .................. | A61B 5/224 600/587 |
| 2009/0102746 A1* | 4/2009 | Fisher | ................ | A63B 24/0006 345/8 |
| 2009/0291726 A1* | 11/2009 | Svensson | ................ | G01S 19/19 463/7 |
| 2009/0299232 A1* | 12/2009 | Lanfermann | ........ | A61B 5/1122 600/595 |
| 2010/0222179 A1* | 9/2010 | Temple | .............. | A63B 24/0062 482/8 |
| 2011/0098928 A1* | 4/2011 | Hoffman | ............ | A63B 71/0622 702/5 |
| 2012/0116550 A1* | 5/2012 | Hoffman | ............ | A63B 24/0084 700/91 |
| 2012/0183940 A1* | 7/2012 | Aragones | .............. | G06F 1/1626 434/247 |
| 2012/0290109 A1* | 11/2012 | Engelberg | ........... | G06F 19/3481 700/91 |
| 2013/0072353 A1* | 3/2013 | Alessandri | ........... | A63B 21/062 482/8 |
| 2017/0329933 A1* | 11/2017 | Brust | .................... | G06F 16/252 |

* cited by examiner

*Primary Examiner* — Steven J Hylinski (57) ABSTRACT

In one embodiment, companion electronic devices for the display of a traceable image by a first electronic device and a tracing of the traceable image as a result of movement of a second electronic device for sports conditioning and therapeutic rehabilitation of a user interacting therewith, are disclosed herein.

18 Claims, 4 Drawing Sheets

CONDITIONING AND REHABILITATION SYSTEM AND RELATED METHODS USING COMPANION ELECTRONIC DEVICES

TECHNICAL FIELD

The disclosure herein relates to a conditioning and rehabilitation system and related methods, and more particularly to the implementation and use of companion electronic devices for the display of a traceable image by a first electronic device and a tracing of the traceable image as a result of movement of a second electronic device for sports conditioning and therapeutic rehabilitation of a user interacting therewith.

BACKGROUND

Advances in technology have made electronic devices including portable or mobile devices, computer devices, and entertainment systems very popular. Many of the devices may be carried almost anywhere and used for a variety of purposes including making and receiving phone calls, sending and receiving text messages and emails, navigation, purchasing items, sharing photos, listening to music or watching videos, and accessing the Internet. An electronic device may include applications that access a variety of content and allow users to interact with the content in various ways for purposes of research, social media, entertainment, current events and weather, or health and well-being to name a few. With healthcare cost for sickness, injury, and rehabilitation increasing dramatically, medical applications are finding widespread acceptance to facilitate efficient and cost effective diagnosis, treatment, and management.

In addition to their social costs, workplace injuries and illnesses have a major impact on an employer's bottom line. It has been estimated by one source that employers pay almost $1 billion per week for direct workers' compensation costs alone. The costs of workplace injuries and illnesses include direct and indirect costs. Direct costs include workers' compensation payments, medical expenses, and costs for legal services. Examples of indirect costs include training replacement employees, accident investigation and implementation of corrective measures, lost productivity, repairs of damaged equipment and property, and costs associated with lower employee morale and absenteeism.

Nagging back ache, muscle and joint pain, and the diminished mobility associated with the aging process can lead to diminished physical capacitance, as well as mental stress and anxiety. Loss of physical capacity erodes many aspects associated with the quality of life. Sports enthusiasts, recreational players, and even those that do not follow an exercise regime can benefit from increased flexibility and conditioning.

Although the sports and medical community utilized a variety of applications, to date, none are used for sports conditioning or therapeutic rehabilitation. Accordingly, there is a need for the implementation and use of companion electronic devices for the display of a traceable image by a first electronic device and a tracing of the traceable image as a result of movement of a second electronic device for sports conditioning and therapeutic rehabilitation of a user interacting therewith.

SUMMARY

For the purpose of summarizing the claimed subject matter certain embodiments have been described. It is to be understood that not all disclosed objects may be achieved in accordance with any particular embodiment. Thus, for example, those skilled in the art will recognize that the device described herein may be embodied or carried out in a manner that achieves or optimizes one objective as taught herein without necessarily achieving other objectives.

In accordance with one embodiment, there is disclosed a method comprising at a mobile device with one or more processors and memory; establishing a wireless connection with a first electronic device; generating a traceable image on a display of the first electronic device; determining an initial position of the mobile device; generating a visual cue on the display of the first electronic device corresponding to the initial position of the second electronic device, and moving the mobile device to correspondingly move the visual cue to trace the traceable image of the first electronic device and show representative movement of the mobile device.

Various embodiments will become readily apparent to those skilled in the art from the following detailed description having reference to the attached figures, the subject matter described herein not being limited to any particular embodiment(s) disclosed.

DETAILED DESCRIPTION

Exemplary embodiments will now be described with references to the accompanying figures, with like reference numerals referring to like elements throughout. The terminology used in the description is not intended to be interpreted in any limited or restrictive manner, simply because it is being utilized in conjunction with a detailed description of certain embodiments. Furthermore, various embodiments (whether or not specifically described herein) may include novel features, no single one of which is solely responsible for its desirable attributes or which is essential to practicing the subject matter described herein.

The use of electronic devices is widespread and has found acceptance and utility in many personal, social, industry, and business endeavors. The utility of many electronic devices is made possible by advancements in technology and the use of one or more applications. In this regard, an application may be defined as software designed to perform a group of coordinated functions, tasks, or activities for the benefit of the user. Examples of an application include a simple calculator, or a word processor, a spreadsheet, a web browser, a media player, a flight simulator, interactive game or entertainment multimedia, or a photo editor, to name a few. Applications may be bundled with the electronic device, published and downloaded to the electronic device, or made available through access or communication with an external device. The sports and medical community utilized a variety of applications, but to date, none are used for sports conditioning or therapeutic rehabilitation as disclosed herein.

Accordingly, there is a need for the implementation and use of companion electronic devices for the display of a traceable image by a first electronic device and a tracing of the image as a result of movement of a second electronic device for sports conditioning and therapeutic rehabilitation of a user interacting therewith. Techniques disclosed herein are directed toward generating a traceable image on a display of a first electronic device, determining an initial position and of a second electronic device using sensor data, generating a visual cue on the display of the first electronic device corresponding to the initial position of the second electronic device, moving the second electronic device to correspondingly move the visual cue to trace the traceable image of the first electronic device and to show representative movement of the user.

In one embodiment, the system described herein may be considered a sports conditioning system configured and designed to improve the flexibility, strength, and control, of among other things, the hips and core structure of a user, while ingraining and refining patterns of movement directly applicable to comparable movements used in a variety of sporting activities or a range of movements for an acceptable level of health and well-being. Such patterns of movement and their corresponding sporting activities include, but are not limited to the swing of a golf club, a baseball bat, and a tennis racket, as well as other endeavors where rotational movement of the hips and core structure including associated muscle groups are activated.

In one embodiment, the system described herein may be considered a therapeutic rehabilitation system configured and designed to improve the user's everyday body functionality and quality of life by reducing or relieving back, hip, neck, and shoulder pain, as well as increasing blood flow to the pelvic region that may, for example, improve erectile dysfunction (ED) in men. The system may further improve posture by conditioning the hips and core structure, as well as increasing the user's range of motion, flexibility, functionality, control, and strength of various body parts.

One study shows that people experiencing back pain generally have weak, underdeveloped or untrained inner core muscles. The most important of the inner core stabilizing muscles are the transversus abdominis (the deepest layer of lateral abdominal muscles), the lumbar multifidi (the deepest of the lower back muscles) and the pelvic floor muscles. The study further shows that people with a history of low back pain may tend to use the stronger outer core muscles for the tasks that would normally, in a healthy system, call on the inner core muscles to perform. Such activity further weakens the inner core muscles leading to a cycle of mind-body "discontinuity" formation by improperly training the body to rely on the wrong muscle groups. In one embodiment, the system described herein targets the inner core muscles and trains them to become a consistent support system for the body.

In a related manner, the system described herein may assist a person to overcome kinesiophobia (a well-documented disorder where a person believes that movement can cause more injury and pain) and help them gain a greater range of motion (ROM), and ultimately allow them to heal. In this regard, it is believed that the active thought region(s) of the brain is distracted when using the system as disclosed herein, and the brain ceases or reduces cognitive activity in sending signals that are intended to protect the injured area by limiting the range of motion to the injured area. As ROM movements associated with the system described herein are generally non-threatening and create little or no pain, the brain perceives the activity as being safe. As described in more detail below, various traceable images, for example, those that include an average ROM for a certain age and/or gender group(s) may be utilize with the system disclosed herein. As such, a therapist may isolate a specific area to be tested by having a patient go through the various ranges of motion with the traceable image at a specified distance.

In a related manner, the system described herein may assist in determining ROM as it may relate to disability claims or similar type health related insurance claims. ROM testing using the system as described herein may test an employee's baseline ROM prior to being hired and a subsequent ROM after a claim for injury or disability has been initiated. In a similar manner, the system described herein may improve various aspects of the mind (mental), body, and/or spirit. In this regard, the system may be configured and designed to increase mental focus, improve brain and visual coordination, increase reading and comprehension, improve balance, as well as posture and general body alignment, relieve stress, and open energy channels or meridians throughout the body.

The system described herein may be configured and designed to increase the ability for nonverbal communication, as well as improve manual dexterity, hand-eye coordination, and nerve regeneration. In this regard, the system described herein includes companion electronic devices for the display of a traceable image by a first electronic device and a tracing of the image as a result of movement of a second electronic device for sports conditioning and therapeutic rehabilitation of a user interacting therewith. The system described herein provides a precise and continuous real time visual representation of the user's body movement including movements of the user's hips, head, finger, fingertip, and shoulders, to name a few, when performing designated movement patterns designed to condition or rehabilitate the user's hips and core structure to relieve back or hip pain, improve various aspects of the mind (mental), body, and/or spirit, as well as increase the ability for nonverbal communication, manual dexterity, hand-eye coordination, and nerve regeneration.

In one embodiment, a visual cue such as a circle, X, pointer, etc., is used to represent a user's body movements. In this regard, the visual cue corresponds to movement of the second device and the user's body movement. The visual cue is generated and positioned on a traceable image of the first electronic device. The traceable image includes one or more predetermined movement pattern(s) formed thereon so that the user may attempt to follow or trace the movement pattern(s) with the user's own movement to increase among other things, flexibility, strength, and control of the user's hips and core structure. Such visual representation of the user's body movement provides an immediate feedback response to guide the user in proper biomechanics. In this regard, the "direct visual feedback" provided by the system is a relaxing and easy to follow road map that forms a unique "mind-body" connection to facilitate significant gains in body strength and flexibility in a relatively short period of time.

The system described herein may be considered as combining physical movements with multi-sensory stimulation that benefit the user psychologically including right-left brain integration, improvement in the ability to focus, and mind-body cohesion. The system may further help to break the cycle of "discontinuities" between the mind and body, and to permit new and proper habits to form by activating the proper muscle groups on a subconscious level so proper movement patterns become common practice.

In another embodiment, movement of the visual cue that is used to track the user's body movement may be converted into electronic or digital data capable of being stored on a computer readable medium or similar storage device for later viewing and analysis by the user, trainer, or medical personal. In this regard, the system described herein may further include one or more processing elements and program instructions for directing the one or more processing elements with access to a storage device.

Persons of ordinary skill in the art will understand that various structural aspects, principals, advantages, benefits, and other characteristics of the conditioning and rehabilitation system described herein including use of the visual cue and various traceable images are applicable to other embodiments of the system inherent in the disclosure.

Figure 1:
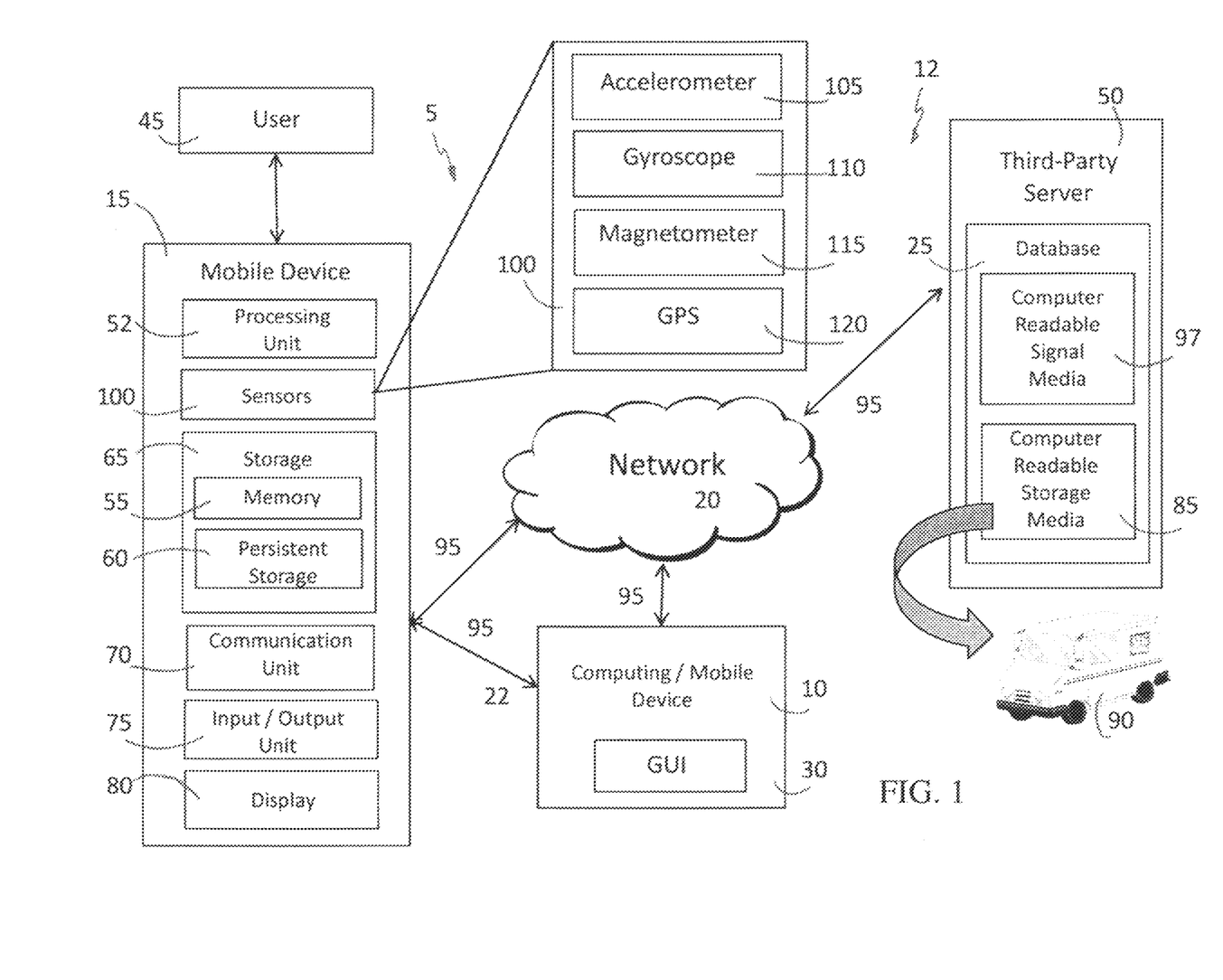
FIG. 1 is an illustrative diagram of an operating environment of a conditioning and rehabilitation system in accordance with one embodiment as disclosed herein.

FIG. 1 is an illustrative diagram of an operating environment of a conditioning and rehabilitation system in accordance with one embodiment as disclosed herein. The conditioning and rehabilitation system 5, herein referred to simply as "system" includes a first electronic device 10 and a second electronic device 15 communicating with each over a network 20. The system disclosed herein comprises one or more electronic devices configured to perform particular operations or actions by virtue of having software, firmware, hardware, or a combination of them installed on the devices 10, 15 or accessible by the devices 10,15 that in operation causes or cause the system to perform the actions. One or more applications or programs can be configured to perform particular operations or actions by virtue of including instructions that, when executed by one or more processing units cause the electronic devices 10, 15 to perform the action.

Figure 2:
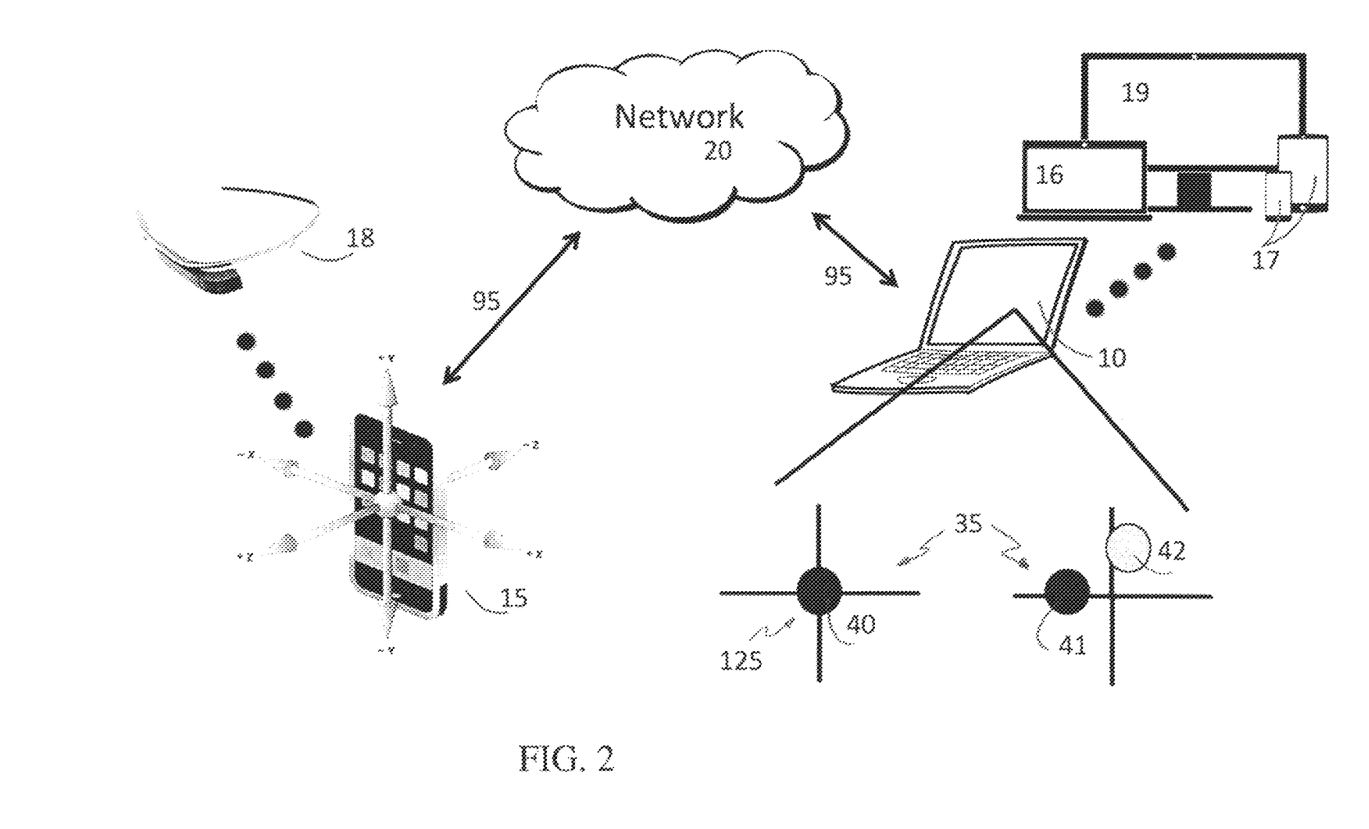
FIG. 2 is an illustrative diagram of a conditioning and rehabilitation system using companion electronic devices for display of a traceable image by a first electronic device and a tracing of the traceable image as a result of movement of a second electronic device in accordance with one embodiment as disclosed herein.

As shown in FIG. 2, electronic devices as disclosed herein may include a computer 16 such as a desktop and laptop computer; a portable or mobile device 17 such as palmtop, mobile phone, smart phone, multimedia phone, portable media player, smart tablet; wearable electronic 18 such as a smartwatch, and smart glasses; and an entertainment system 19 including a television and those typically associated with game playing. Electronic devices as disclosed herein are generally defined by four criteria, (1) both electronic devices 10, 15 are configured to access and utilize a software application 25 to perform a task, (2) both electronic devices 10, 15 are configured to access the same network 20, (3) at least one electronic device is portable enough to be attached to user's body, and (4) the other electronic device has a graphical user interface (GUI) 30 for display of a traceable image 35. The first electronic device 10 includes a GUI 80 for display of the traceable image 35 and the second electronic device 15 when moved, correspondingly moves a visual cue 40 to trace the traceable image 35 of the first electronic device 10. The GUI 30, 80 of the first electronic device 10 and second electronic device 15 may be a plasma display, LED display, OLED display or any similar display component capable of displaying an image for viewing.

As further shown in FIG. 2, the system 5 employs companion electronic devices (first electronic device 10 and second electronic device 15) for the display of a traceable image 35 by the first electronic device 10 and a tracing of the traceable image 35 resulting from movement of the second electronic device 15 for sports conditioning or therapeutic rehabilitation of a user 45 interacting therewith. The second electronic device 15 is typically attached to some part of the user's body (waist, shoulder, head, arm, leg, etc.). The traceable image 35 of the first electronic device 10 may include various patterns, shapes, or indicia in which the user 45 of the system 5 attempts to trace with the visual cue 40 appearing on the GUI (display) of the first electronic device 10 by moving the second electronic device 15 to elicit a corresponding movement of the visual cue 40.

As described herein, the system 5 discloses the use of companion electronic devices. In this regard, the first electronic device 10 and second electronic device 15 communicate with each other through a network 20 for the display of a traceable image 35 by the first electronic device 10 and a tracing of the traceable image 35 resulting from movement of the second electronic device 15 for sports conditioning and therapeutic rehabilitation of a user 45 interacting therewith. Network 20 is the medium used to provide communication links between the various electronic devices 10, 15, 50 via their associated hardware and software components. In the operational environment 12 shown in FIG. 1, the first electronic device 10, the second electronic device 15, and a third-party server 50 are connected to the network 20 either through a wired connection 22 such at the one shown between the first electronic device 10 and the second electronic device 15, a wireless connection represented by the network 20, or a combination of wired and wireless connections.

Network 20 represents a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, personal, and other computer systems that route data and messages. Of course network 20 may be implemented as a number of different types of networks, for example, an intranet, a local area network (LAN), or a wide area network (WAN). In some embodiments the network 20 includes Bluetooth® communication networks, WiFi®, or cellular communications network for sending and receiving data including via short messaging service (SMS), multimedia messaging service (MMS), hypertext transfer protocol (HTTP), directed data connection, email, etc. Although FIG. 1 shows one network 20 in communication with a first electronic device 10, a second electronic device 15, and a third-party server 50, in practice one or more networks may be in communication with these entities.

Second electronic device 15 is represented in FIG. 1 as a mobile device. In this regard, mobile device 15 is a broad category encompassing many possible devices. For example, FIG. 2 shows mobile device as wearable glasses. As indicated herein, the only criteria for second electronic device 15 is the following: (1) being configured to access and utilize a software application 25 to perform a task, (2) configured to access the same network 20 as the first electronic device 10, and (3) it is portable enough to be attached to user's body. For efficiency and conciseness, items described as associated with the mobile device 15 may be understood to be associated with the first electronic device 10 and the third-party server 50 even though they are not graphically shown as being associated with the first electronic device 10 and third-party server 50.

Processing unit 52 serves to execute instructions 95 from software that may be loaded into and accessed from storage 65. The processing unit 52 includes an arithmetic logic unit, a microprocessor, a general-purpose controller, or some other processor array to perform computations and provide electronic instructions and/or display signals to a display device 30, 80 or other system element. The processing unit 52 processes data signals and may include various computing architectures including a complex instruction set (CISC) architecture, a reduced instruction set computer (RISC) architecture, or an architecture implementing combination of instruction sets. Processing unit 52 may be a set of one or more processors or may be a multi-processor core, depending on the particular implementation. Further, processor unit 52 may be implemented using one or more heterogeneous processor systems, in which a main processor is present with secondary processors on a single chip. As another example, processor unit 52 may be a symmetric multi-processor system containing multiple processors of the same type.

Memory 55 and persistent storage 60 are examples of storage devices 65. A storage device is any piece of hardware that is capable of storing information, such as and without limitation, data, program code in functional form, and/or other suitable information either on a temporary basis and/or a permanent basis. Memory 55 in these examples, may be a random access memory, or any other suitable volatile or non-volatile storage device. Persistent storage 60 may take various forms depending on the particular implementation. For example persistent storage 60 may contain one or more components or devices including a hard drive, a flash memory, a rewritable optical disk, a rewritable magnetic tape, or some combination of the above. The media used by persistent storage 60 may in one example be a removable hard drive.

Communication unit 70 provides for communication with other devices 10 as may be present in the operating environment 12, as well as the third-party server 50. In one example, communication unit 70 may provide communication (transmit and/or receive data) with other electronic devices connected to the network 20 through the use of either a physical and/or wireless communication links.

Input/output unit 75 allows for the input and output of data with other devices that may be connected within the operating environment 12. For example, input/output unit 75 may provide a connection for user 45 input through physical movement of the mobile device 15, a keyboard, a mouse, and/or some other suitable input device. Further input/output unit 75 may send output to a printer. Display 80 or graphical user interface (GUI) displays information for viewing by the user 45.

Instructions 95, program code, computer usable program code, or computer readable program code, which may be read and executed by processing unit 52 of the second electronic device 15 and a similar processing unit of the first electronic device 10, form programs or applications for performing a task are located in the database 25 of the third-party server 50. Instructions 95 may be stored in a functional form on computer readable storage media 85. The readable storage media 85 may include a non-transitory computer-readable medium having instructions 95 embedded thereon for providing conditioning and rehabilitation of a user in a system 5 comprising companion electronic devices 10, 15, the instruction including computer code which, when executed by one or both of the companion electronic devices 10, 15, causes the one or more companion electronic device 10, 15 to receive a first instructions on the first electronic device 10; receive a second instructions on a second electronic device 15; generate a traceable image 35 on a display 30 of the first electronic device 10; determine an initial position 125 of the second electronic device 15; generate a visual cue 40 on the display 30 of the first electronic device 10 corresponding to the initial position 125 of the second electronic device 15, and move the second electronic device 15 to correspondingly move the visual cue 40 to trace the traceable image 35 of the first electronic device 10 and show representative movement of the user 45.

Computer readable storage media 85 such as the non-transitory computer-readable medium may include an optical or magnetic disc that is inserted or placed into a drive or other device that is part of the persistent storage 60. Computer readable storage media 85 also may take the form of a persistent storage such as a hard drive, a thumb drive, or a flash memory that is connected to the first electronic device 10 and/or the second electronic device 15. The computer readable storage media 85 may be obtained by the user 45 through various means such as air or ground mail service 90 for use with the first electronic device 10 and/or the second electronic device 15.

Alternatively, instructions or program code 95 may be transferred to the first electronic device 10 and/or the second electronic device 15 using computer readable signal media 97. Computer readable signal media 97 may be a propagated data signal containing the instructions 95 or program code forming an application or program. Computer readable signal media 97 may be an electro-magnetic signal, an optical signal, and/or any other suitable type signal. These signals may be transmitted/communicated over communication links such as wireless communication links, an optical fiber cable, a coaxial cable a wire, and/or any other similar type of communication link. In other words, the communication link and/or the connections may be physical or wireless in the network 20 of operating environment 12. In this regard, the computer readable signal media may be downloaded over the network 20 to the first electronic device 10 and/or the second electronic device 15 to storage 65 from the third-party server 50 or from another intermediary server or entity. The computer readable signal media 97 is placed in storage 65 as non-transitory computer-readable medium for access by the processor unit 65 to causes the one or more companion electronic device 10, 15 to receive a first instructions on the first electronic device 10; receive a second instructions on a second electronic device 15; generate a traceable image 35 on a display 30 of the first electronic device 10; determine an initial position 125 of the second electronic device 15; generate a visual cue 40 on the display 30 of the first electronic device 10 corresponding to the initial position 125 of the second electronic device 15, and move the second electronic device 15 to correspondingly move the visual cue 40 to trace the traceable image 35 of the first electronic device 10 and show representative movement of the user 45.

Sensors 100 of the second electronic device 15 may comprise one or more devices capable of providing sensor data that can be used to provide an initial position 125 of the second electronic device 15 and subsequent movement of the second electronic device 15 relative to the initial position 125. The one or more sensors 100 may include one or more micro-electromechanical sensors (MEMS-based sensors) configured to provide MEMS sensor data. The MEMS sensors may provide data regarding vertical acceleration, horizontal acceleration, rotational motion, and directional motion to the processing unit 52 communicatively coupled with the one or more MEMS-based sensor and configured to obtain the MEMS sensor data from the one or more MEMS-based sensors to determine an estimate of location, position, movement, or external environment of the second electronic device 15.

The sensors 100 may include various electronic, mechanical, electromechanical, optical, or other devices that provide the MEMS-based sensor data/information related to the second electronic device 15. Sensors 100 in some embodiments can provide digital signals to processing unit 52. Any type of and combination of sensors can be used; shown by way example are an accelerometer 105, gyroscope 110, magnetometer 115, and a Global Positioning System (GPS) receiver 120. In one embodiment, as shown in FIG. 2 the second electronic device 15 utilizes the accelerometer 105, gyroscope 110, and magnetometer 115 to determine an initial position 125 of the second electronic device 15 and movement from the initial position 125 of the second electronic device 15, i.e., representative movement of the user 45. In this regard, the accelerometer 105 can sense acceleration along one or more axes, e.g., using piezoelectric or other components in conjunction with associated electronics to produce a signal. Gyroscope 110 can sense rotational motion in one or more directions, e.g., using one or more gyroscopes and related control and sensing circuitry. Magnetometer 115 can sense an ambient magnetic field, e.g., earth's magnetic field, and generate a corresponding electrical signal, which can be interpreted as a compass direction. GPS receiver can determine location based on signals received from GPS satellites. Other sensors can also be included in addition to or instead of those mentioned.

A bus system (not shown), may be used to implement communication fabric and may be comprised of one or more buses, such as a system bus or an input/output bus. Of course the bus system may be implemented using any suitable architecture that provides for a transfer of data between different components or devices attached to the bus system. Additionally, a communication unit may include one or more devices used to transmit and receive data, such as a modem or network adapter. Further, a memory may be a cache such as found in an interface and memory controller hub that may be present in the communication fabric.

The different components illustrated for system 5 are not meant to provide architectural limitations to the manner in which different embodiments may be implemented. The different illustrative embodiments may be implement in the system 5 including components in addition to or in place of those illustrated for the system 5. Other components shown in FIG. 1 can be varied from the illustrative example shown. The different embodiments may be implemented using any hardware device or system capable of executing program code. As one example, system 5, may include organic components integrated with inorganic components and/or may be comprised entirely of organic components excluding a human being. For example, a storage device may be comprised of an organic semiconductor.

Figure 3:
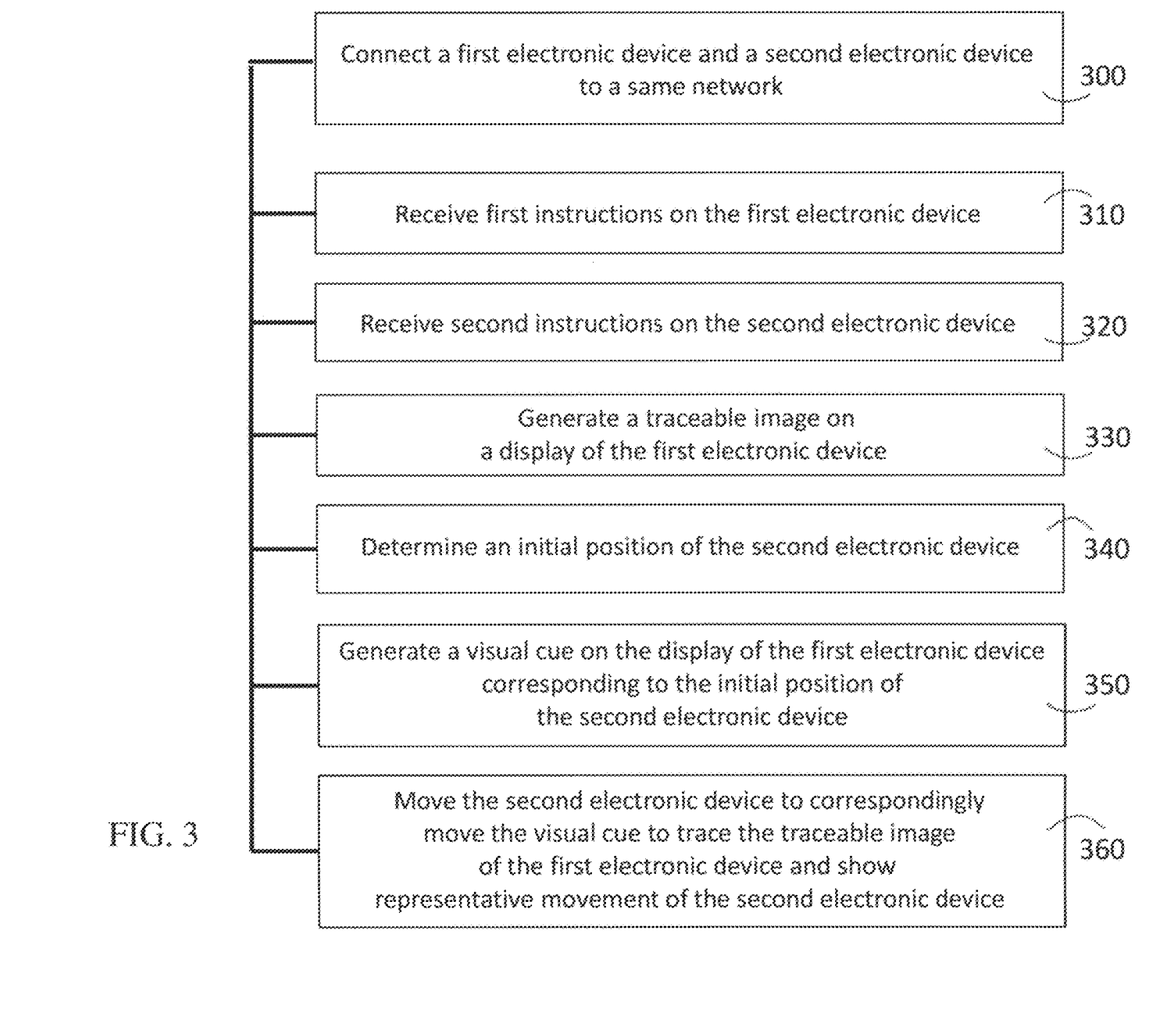
FIG. 3 is a flowchart of an example method for display of a traceable image by a first electronic device and a tracing of the traceable image as a result of movement of a second electronic device in accordance with one embodiment of the conditioning and rehabilitation system as disclosed herein.

Turning now to FIG. 3, a flowchart of an example method for display of a traceable image by a first electronic device and a tracing of the traceable image as a result of movement of a second electronic device in accordance with one embodiment of the conditioning and rehabilitation system is shown. In one embodiment of the system 5, the method or steps define four criteria for the electronic devices 10, 15, (1) both electronic devices 10, 15 are configured to access and utilize a software application 25 to perform a task, (2) both electronic devices 10, 15 are configured to access the same network 20, (3) at least one electronic device is portable enough to be attached to user's body, and (4) the other electronic device has a graphical user interface (GUI) 30 for display of a traceable image 35.

In this regard, in Step 300 the first electronic device 10 and the second electronic device 15 are connected to the same network 20. As disclosed herein, a laptop computer 10 and a mobile device are representative examples of a first electronic device 10 and a second electronic device 15 respectively, but a plethora of different electronic devices are capable of preforming the role of the first electronic device and the second electronic device. Connection to the network 20 may be a wired connection, a wireless connection, or a combination of a wired connection and a wireless connection.

In Step 310 and Step 320, and as shown in FIG. 1 and FIG. 2, the first electronic device 10 receives first instructions 95 and the second electronic device 15 receives second instructions 95, i.e., program code. As disclosed herein, the instructions form programs or applications for performing the tasks as disclosed in Steps 330, 340, 350, and 360. The first instructions and second instructions 95 may be received separately by the respective electronic device 10, 15 or the instructions may be received by one electronic device then transmitted to the other electronic device. Transmission of the first instructions and the second instructions may be entirely via the network 20 and/or received by a mail service in the form of a disk, drive, stick, or a similar storage media for download on either the first electronic device 10 or the second electronic device 15.

In Step 330, a traceable image 35 is generated on the display 30 of the first electronic device 10. FIG. 2 shows one embodiment of the traceable image 35 for use with the system 5. As indicated above, the traceable image 35 is generated for display on the first electronic device 10. The traceable image 35 may include movement patterns or shapes such as a circle, oval, ellipse, or figure-eight, etc., formed alone or in combination upon an X and Y Cartesian coordinate system that are designed to improve the flexibility, strength, and control, of among other things, the hips and core structure of a user 45, while ingraining and refining patterns of movement directly applicable to comparable movements used in a variety of sporting endeavors or simply to improve the health and well-being of the user 45. The movement pattern(s) of the traceable image 35 are designed so that the user 45 may attempt to follow or trace the movement patterns with the user's own movement to thereby increase flexibility, strength, and control of the user's hips and core structure. In one example, the hips of the user 45 are used to move the second electronic device 15 to trace the movement patterns while following precise guidelines for postural alignment, appropriate use of force or muscle control, and number of repetitions or pattern tracing while progressing through various levels of pattern difficulty.

In Step 340, an initial position 125 of the second electronic device 15 is determined/calculated using one or more of the sensors 100 (accelerometer 105, gyroscope 110, magnetometer 115, and/or GPS 120). In this regard, the second electronic device 15 is positioned, attached, or otherwise secured to a part of the user's 45 body and the second electronic device 15 is maintained motionless for a short duration of time to allow fusion of data from the one or more sensors 100 to determine/calibrate the initial position 125 of the second electronic device 15. Attachment to any particular part of the user's body (head, shoulder(s), upper torso, waist, or extremities) is usually determined by the sports conditioning and/or therapeutic rehabilitation objective. In this regard, the second electronic device 15 may be positioned on virtually any part of the user's body in which it is desired to increase blood flow, and improve flexibility, coordination, strength, and control to name a few benefits. Securing the second electronic device 15 to the user 45 may be accomplished in many different ways, but should allow the user's 45 body and the second electronic device 15 to move together as a unit with relative ease so as to more accurately represent movement on the first electronic device 10 corresponding to movement of the user 45.

The position data is received and processed by the processing unit 52 of the second electronic device 15 which may then generate a visual cue 40 based on the initial position 125 and transmit the visual cue 40 to the first electronic device 10 for display 30 or communicate the position data to the first electronic device 10 which will then process the position data to generate the visual cue 40 for display. In other words, either the first electronic device 10 or the second electronic device 15 may generate the visual cue 40 representing the initial position 125 of the second electronic device 15 for display on the first electronic device as indicated in Step 350.

In Step 360, the second electric device 15 is moved by the user to trace the traceable image 35 of the first electronic device 10 with the visual cue 40. Movement of the visual cue 40 corresponding to movement of the second electronic device 15 is therefore representative of the user's 45 movement. One or more of the sensors 100 continually update the position of the second electronic device 15 and communicate the subsequent position data to the processing unit 52. The updated position of the second electronic device 15 is communicated to the first electronic device 11 to effectuate positioning of the visual cue 40; representing movement of the user 45. The actual distance between the first electronic device 10 and the second electronic device 15, which typically would affect the degree or amount of movement of the visual cue representing the user's movement, is not utilized by the system 5. If the distance between the first electronic device 10 and the second electronic device 15 were a factor, movement at five feet from the traceable image 35 would move the visual cue a greater degree of movement when compared to the same movement at twenty feet from the traceable image 35. This is not the case as the system 5 does not compensation for distance, rather the system 5 does simulate an approximate range of distance allowing a consistent experience by the user 45 in a range of area of use.

Figure 4:
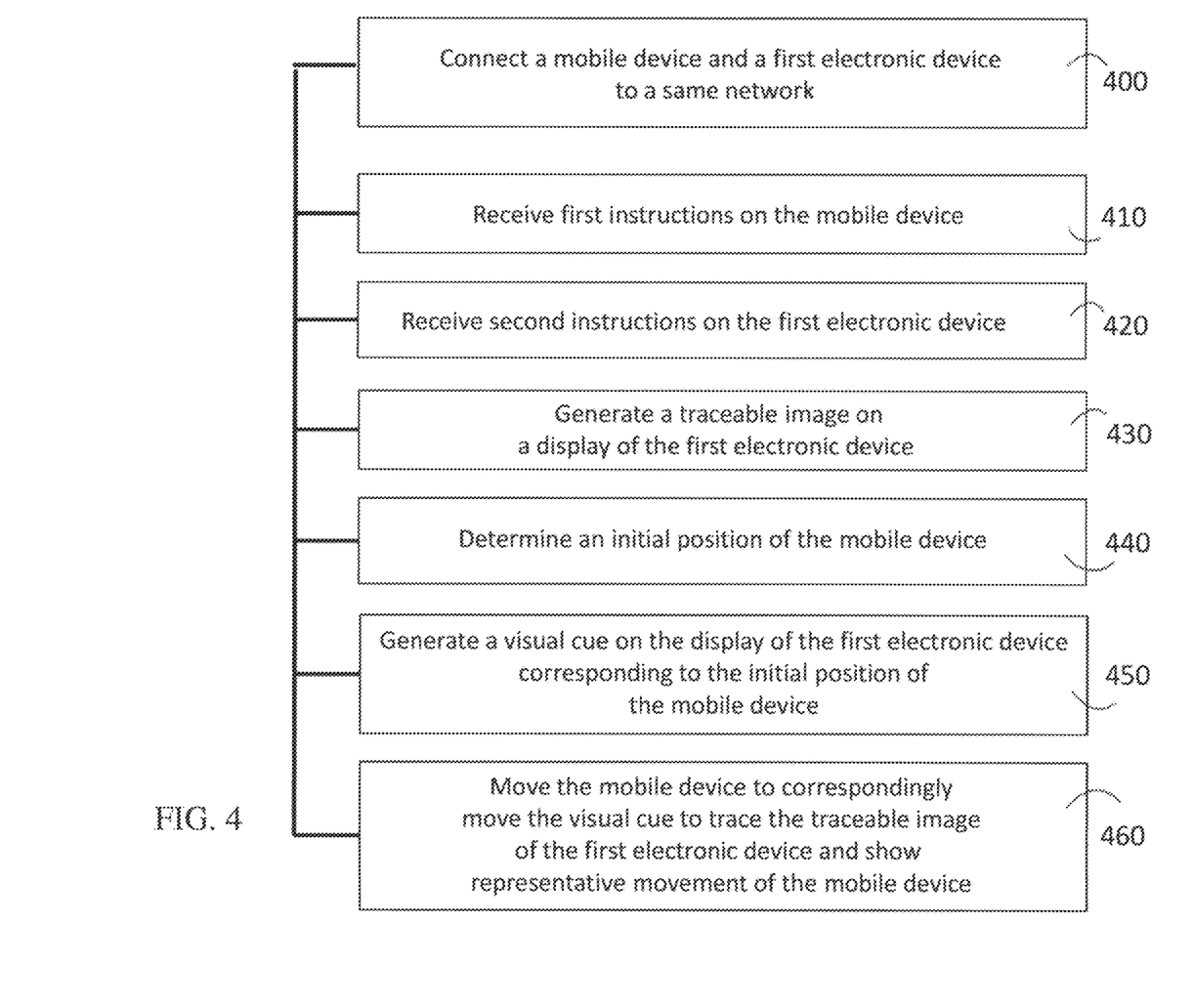
FIG. 4 is a flowchart of an example method for display of a traceable image by a first electronic device and a tracing of the traceable image as a result of movement of a mobile device in accordance with one embodiment of the conditioning and rehabilitation system as disclosed herein.

FIG. 4, is a flowchart of an example method for display of a traceable image by a first electronic device and a tracing of the traceable image as a result of movement of a mobile device in accordance with one embodiment of the conditioning and rehabilitation system as disclosed herein. In this regard, the method steps 400-460 of FIG. 4 are similar to the method steps 300-360 of FIG. 3 with the exception of the second electronic device 15 being specified as a mobile device. In this regard, the method steps comprise Step 400, connect a mobile device 15 and a first electronic device 10 to a same network 20; Step 410, receive first instructions on the mobile device 15; Step 420, receive second instructions on the first electronic device 10; Step 430, generate a traceable image 35 on a display 30 of the first electronic device 10; Step 440 determine an initial position 125 of the mobile device 15; Step 450 generate a visual cue 40 on the display 30 of the first electronic device 10 corresponding to the initial position 125 of the mobile device 15; and Step 460 move the mobile device 15 to correspondingly move the visual cue 40 to trace the traceable image 35 of the first electronic device 10 and show representative movement of the mobile device 15.

As shown in FIG. 2, visual cues 41, 42 show corresponding movement of the second electronic device 15 as the user 45 attempts to trace the traceable image 35 with the second electronic device 15. Visual cue 41 represents movement of the user 45 to the left of the initial position 125, and visual cue 42 represents movement of the user 45 backward or away from the first electronic device 10 and to the right of the initial position 125. The visual representation of the user's body movement as indicted by the visual cue 40 provides an immediate feedback response to guide the user 45 in proper biomechanics. In this regard, the "direct visual feedback" provided s forms a unique "mind-body" connection to facilitate significant gains in body strength and flexibility in a relatively short period of time. The system 5, processing unit 52, and instructions 95 may allow for a variation in the size or thickness of the visual cue 40 to allow a variation in the level of difficulty when attempting trace the traceable image 35.

The system 5 is configured to retain, convert, and store data documenting the positioning of the visual cue 40 representing movement of the user 45 into electronic or digital data history log capable of being stored on a computer readable medium or similar storage device for later viewing and analysis by the user 45. In this regard, the processing unit 52 may receive instructions that permit access to a storage device, and a processing-readable medium having executable instructions thereon to direct the processing unit 52 to display the electronic data as a visual representation of the user's movement of the traceable image 35. Such data storage of positioning information may be coupled with video taping of the user 45 performing the movements. In this regard, the user 45 may display and review the combination of movement tracing and video taping to better isolate problem areas and to fine tune body movements to achieve superior conditioning of the hips and core structure or body part being utilized in conjunction with the system 5.

The system and methods of the claimed subject matter have been described with some particularity, but the specific designs, constructions and steps disclosed are not to be taken as delimiting of the subject matter. Obvious modifications will make themselves apparent to those of ordinary skill in the art, all of which will not depart from the essence of the claimed subject matter and all such changes and modifications are intended to be encompassed within the appended claims.

What is claimed is:
1. A method comprising:
at a mobile device with one or more processors and memory;
establishing a network connection with a first electronic device;
generating a traceable image on a display of the first electronic device;
determining an initial position of the mobile device;
generating a visual cue on the display of the first electronic device corresponding to the initial position of the mobile device, and
moving the mobile device to correspondingly move the visual cue to trace the traceable image of the first electronic device and show representative movement of the mobile device.

2. The method of claim 1, wherein determining an initial position of the mobile device comprises obtaining position data from one or more sensors of the mobile device.

3. The method of claim 2, wherein determining the initial position of the mobile device does not comprise obtaining a distance measurement between the mobile device and the first electronic device.

4. The method claim 2, wherein determining the initial position of the mobile device comprises obtaining position data from an accelerometer, gyroscope, and magnetometer.

5. The method of claim 1, further comprises positioning the mobile device on a user wherein moving the mobile device to correspondingly move the visual cue to trace the traceable image of the first electronic device will show representative movement of the mobile device and corresponding movement of the user.

6. The method of claim 1, wherein generating the traceable image creates an image that when traced by the visual cue promotes sports conditioning or therapeutic rehabilitation of a user.

7. A mobile device comprising:
a memory and one or more processors configured to execute instructions comprising:
establish a network connection with a first electronic device;
generate a traceable image on a display of the first electronic device;
determine an initial position of the mobile device;
generate a visual cue on the display of the first electronic device corresponding to the initial position of the mobile device, and
move the mobile device to correspondingly move the visual cue to trace the traceable image of the first electronic device and show representative movement of the mobile device.

8. The mobile device of claim 7, wherein the instructions to determine an initial position of the mobile device comprises obtaining position data from one or more sensors of the mobile device.

9. The mobile device of claim 8, wherein the instructions to determine the initial position of the mobile device does not comprise obtaining a distance measurement between the first electronic device and the mobile device.

10. The mobile device of claim 8, wherein the instructions to determine the initial position of the mobile device comprises obtain position data from an accelerometer, gyroscope, and magnetometer.

11. The mobile device of claim 7, wherein the mobile device is positioned on a user wherein the instructions to move the mobile device to correspondingly move the visual cue to trace the traceable image of the first electronic device and show representative movement of the mobile device will further show corresponding movement of the user.

12. The mobile device of claim 7, wherein the instruction to generate the traceable image creates an image that when traced by the visual cue promotes sports conditioning or therapeutic rehabilitation of a user.

13. A non-transitory computer-readable medium having instructions embedded thereon that when executed by one or more processors of a mobile device with memory cause the one or more processors to perform the operations comprising:
establishing a network connection with a first electronic device;
generating a traceable image on a display of the first electronic device;
determining an initial position of the mobile device;
generating a visual cue on the display of the first electronic device corresponding to the initial position of the mobile device, and
moving the mobile device to correspondingly move the visual cue to trace the traceable image of the first electronic device and show representative movement of the mobile device.

14. The non-transitory computer-readable medium of claim 13, wherein the instructions of determining an initial position of the mobile device comprises obtaining position data from one or more sensors of the mobile device.

15. The non-transitory computer-readable medium of claim 14, wherein the instructions of determining the initial position of the mobile device does not comprise obtaining a distance measurement between the first electronic device and the mobile device.

16. The non-transitory computer-readable medium of claim 14, wherein the instructions of determining the initial position of the mobile device comprises obtaining position data from an accelerometer, gyroscope, and magnetometer.

17. The non-transitory computer-readable medium of claim 13, wherein the instructions further necessitate positioning the mobile device on a user wherein moving the mobile device to correspondingly move the visual cue to trace the traceable image of the first electronic device will show representative movement of the mobile device and corresponding movement of the user.

18. The non-transitory computer-readable medium of claim 13, wherein the instructions for generating the traceable image creates an image that when traced by the visual cue promotes sports conditioning or therapeutic rehabilitation of a user.

* * * * *